United States Patent [19]
Jankowski et al.

[11] Patent Number: 5,476,128
[45] Date of Patent: Dec. 19, 1995

[54] AIRCRAFT WHEEL DEMOUNTABLE FLANGE CORROSION SEAL

[75] Inventors: Richard B. Jankowski, South Bend; Brian G. Harker, Granger, both of Ind.

[73] Assignee: AlliedSignal Inc., Morristown, N.J.

[21] Appl. No.: 133,723

[22] Filed: Oct. 7, 1993

[51] Int. Cl.$^6$ ..................................................... B60B 25/04
[52] U.S. Cl. .................................. 152/409; 152/DIG. 10; 152/396
[58] Field of Search ............................ 301/35.1; 152/409, 152/410, DIG. 10, 396

[56] References Cited

U.S. PATENT DOCUMENTS

| | | | |
|---|---|---|---|
| 2,788,050 | 4/1957 | Le Jeune | 152/DIG. 10 X |
| 2,895,526 | 7/1959 | Mueller | 152/410 |
| 2,929,431 | 3/1960 | Mueller | 152/410 |
| 3,783,927 | 1/1974 | Verdier | 152/409 |

*Primary Examiner*—Russell D. Stormer
*Attorney, Agent, or Firm*—Larry J. Palguta; Leo H. McCormick, Jr.

[57] ABSTRACT

A wheel rim assembly (10) includes a first bead flange, and a separable second bead flange (16), the separable second bead flange (16) maintained on a wheel rim (12) of the wheel rim assembly (10) by a retaining ring assembly (20). The retaining ring assembly (20) includes an outboard portion (22) which is partially disposed within an axial opening (18) between the second bead flange (16) and wheel rim (12). The second bead flange (16) and the wheel rim (12) each include an oppositely disposed complementary shaped lobe groove (13, 17) communicating with the axial opening (18). Disposed within the axial opening (18) is a flexible composite corrosion seal (30) comprising a generally rectangularly shaped central flexible member (32) joined with a radially extending flexible base member (35) having a plurality of axially extending protrusions (40) and oppositely disposed, spaced apart flexible lobe members (38, 39) each received within a respective lobe groove (13, 17). The seal (30) is flexible and when installed the lobe members (38, 39) extend radially outwardly to be received within the lobe grooves (13, 17) such that the seal (30) is captured within the axial opening (18) and prevents contaminants from entering into an area (50) between the second bead flange (16) and wheel rim (12) wherein the retaining ring assembly (20) is housed.

7 Claims, 1 Drawing Sheet

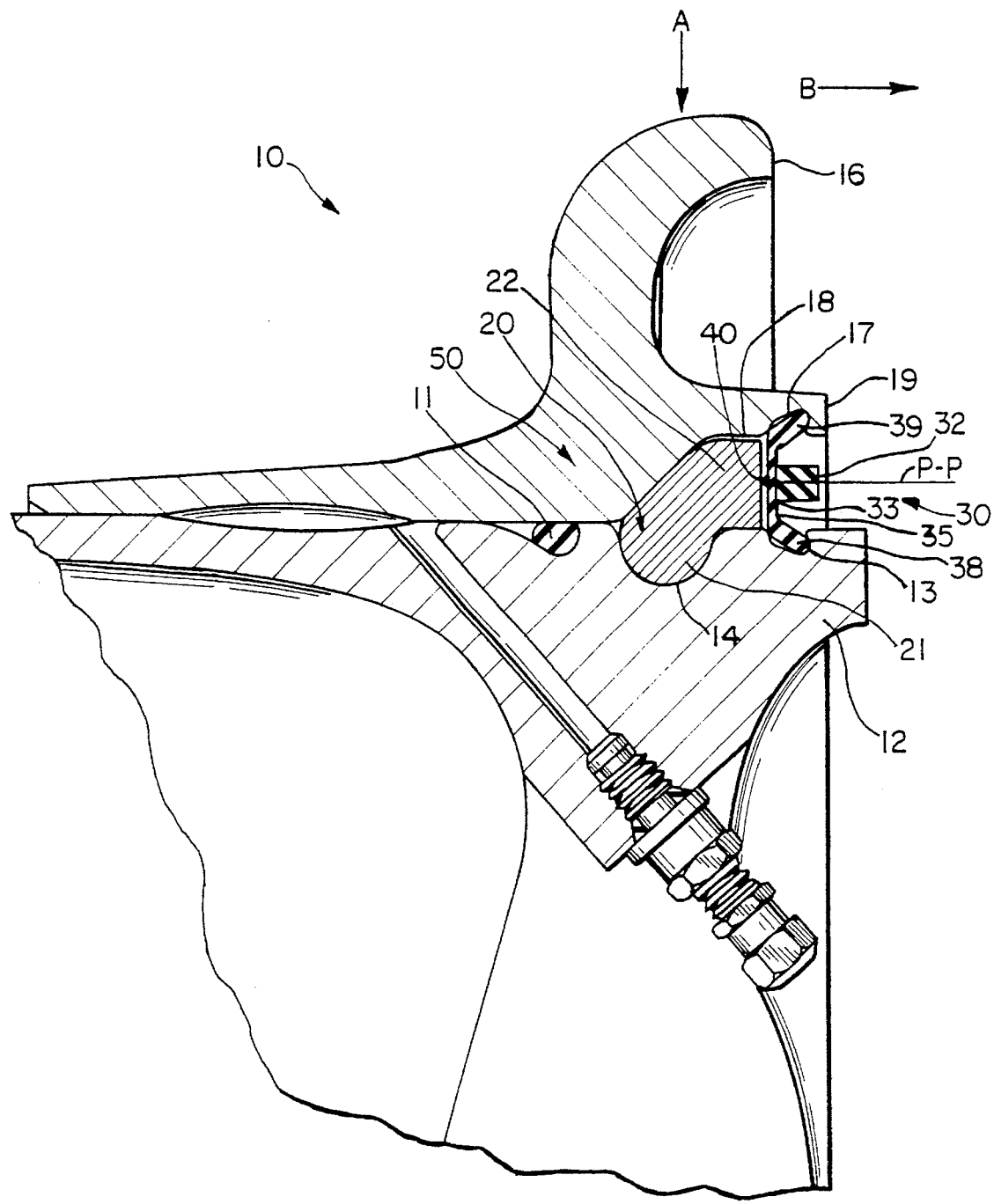

AIRCRAFT WHEEL DEMOUNTABLE FLANGE CORROSION SEAL

This invention relates to a wheel rim assembly having a separable second bead flange retained in place by a retaining ring assembly, with a flexible composite corrosion seal located between the separable second bead flange and wheel rim in order to protect the retaining ring assembly.

Aircraft wheel assemblies comprise an inflatable tire which is first mounted on the wheel rim and then followed by a separable second bead flange which is maintained in place by a retaining ring assembly. Upon inflation of the mounted tire, the outboard tire bead forces the separable second bead flange into tight contacting engagement with the retaining ring assembly. When the tire is deflated, the retaining ring assembly is removed first, followed by the separable bead flange and finally the deflated tire. Such a wheel assembly and retaining ring assembly is described in Van Den Abeele U.S. Pat. No. 4,757,851 owned by the same assignee as herein. When the tire has been inflated and the wheel assembly utilized on an aircraft, it is important that the retaining ring assembly be protected from corrosion, contaminants, and any other matter which could degrade over time or damage the retaining ring assembly that maintains the separable second bead flange in place upon the wheel rim. If a seal is utilized for such protection, it is highly desirable that the seal be easy to install, retain itself in place, be easy to remove, and also compensate for tolerance stack-ups in the area that the seal is seated. Additionally, it is important that the seal be easy to store so that when it is removed from storage it will return to its proper functional shape despite the manner in which it has been stored. The corrosion seal should be easily manufactured from currently available materials which will contribute to reducing its cost.

The present invention provides solutions to the above by providing in a wheel rim assembly having a wheel rim with first bead flange, a separable second bead flange, a retaining ring assembly having inboard and outboard portions, the inboard portion received within a groove in the wheel rim to secure the separable second bead flange on the wheel rim, and a flexible composite seal disposed adjacent the outboard portion of the retaining ring assembly, the wheel rim and the second bead flange having oppositely disposed complementary shaped lobe grooves extending radially inwardly and radially outwardly respectively, an axial opening extending between said second bead flange and wheel rim and being in alignment with said outboard portion, and the flexible composite seal member disposed within the axial opening and oppositely disposed complementary shaped lobe grooves, the composite seal member comprising a central flexible member and a radially extending flexible base member extending at opposite ends into oppositely disposed spaced apart flexible lobe members each received within a respective oppositely disposed complementary shaped lobe groove to retain the composite seal member within the axial opening.

One way of carrying out the invention is described in detail below with reference to the drawing which illustrates an embodiment in which:

The sole FIGURE is a section view of a wheel rim assembly, separable second bead flange, retaining ring assembly, and the flexible composite seal of the present invention.

The wheel rim assembly is designated generally by reference numeral 10. Wheel rim assembly 10 comprises wheel rim 12 having therein a circumferential and radially extending groove 14, and separable second bead flange 16 mounted onto rim 12 and held in place by retaining ring assembly 20. Retaining ring assembly 20 may be any one of several types of retaining ring assemblies having the general shape shown above, and including the assembly illustrated in Van Den Abeele U.S. Pat. No. 4,757,851. A first or inboard bead flange (not shown) is an integral part of wheel rim 12. Separable second bead flange 16 slides axially onto rim 12 to trap sealing means 11 therebetween, and retaining ring assembly includes lobe 21 disposed within groove 14. When an inflatable tire (not shown) is disposed about wheel rim assembly 10, the tire is inflated to force separable second bead flange 16 radially inward in the direction of Arrow A and axially in the direction of Arrow B. Retaining ring assembly 20 is captured between flange 16 and rim 12, with flange 16 maintained axially in place by lobe 21 of ring assembly 20 so that flange 16 cannot be displaced further in the direction of Arrow B.

Separable second bead flange 16 includes a portion of axially extending opening 18 (located between flange 16 and rim 12) extending from its outboard surface 19 toward the axial center of rim 12, opening 18 communicating with groove 14 wherein retaining ring assembly 20 is received. Retaining ring assembly 20 includes the lobe or inboard portion 21 and an outboard portion 22 located within and aligned with axial opening 18. Located toward the outboard portion of axial opening 18 are a pair of oppositely disposed complementary shaped lobe grooves 17 and 13. Groove 17 is located in second bead flange 16 and groove 13 is located in wheel rim 12. Each of the lobe grooves 13, 17 extends radially away from its communication with axial opening 18.

Disposed within axial opening 18 and lobe grooves 13 and 17 is a flexible composite corrosion seal designated generally by reference numeral 30. Corrosion seal 30 comprises a flexible composite seal having a generally rectangularly shaped central flexible member 32 joined at end 33 to radially extending flexible base member 35. Base member 35 of composite seal 30 includes a pair of oppositely disposed spaced apart flexible lobe members 38, 39 and a plurality of axially extending bumps or protrusions 40 which engage or abut outboard portion 22. Lobe member 38 is received within lobe groove 13 and lobe member 39 is received within lobe groove 17. Corrosion seal 30 is a composite seal comprising central flexible member 32 made from H1 Heel Stock which is a proprietary material available from the J. M. Clipper Seal Company of Nacogdoches, Tex. The H1 Heel Stock is joined to base member 35 which comprises butadiene acrylonitrile or what is sometimes called "nitrile rubber". Central flexible member 32 is disposed about peripheral axial centerline P-P.

After separable second bead flange 16, wheel rim 12, and the inflatable tire (not shown) have been assembled as above, corrosion seal 30 is installed easily by pressing the seal axially into axial opening 18 until protrusions 40 engage outboard portion 22 and lobes 38 and 39 extend resiliently radially outwardly into grooves 13 and 17. Grooves 13 and 17 are each disposed at an acute angle relative centerline P-P of flexible member 32. Lobes 38 and 39 are captured within lobe grooves 13 and 17 such that corrosion seal 30 is captured axially and radially between separable second bead flange 16, outboard portion 22, and wheel rim 12. Corrosion seal 30 prevents moisture, contaminants and any other damaging matter from entering into the area 50 defined by groove 14 and axial opening 18, and protects retaining ring assembly 20 from degradation or damage over time. Because of its flexibility and the bump like protrusions 40 on the axially inward side of base member 35, corrosion seal 30 compensates for any tolerance stack ups in the proximity of the area of its installation between flange 16 and rim 12, and compensates for changes in wheel shape due to ground loads transmitted through the tire into the wheel. The corrosion seal is easily removed by simply pulling axially outwardly (toward the right in the sole FIGURE) on the H1 Heal Stock flexible member 32 with needle nose pliers. No special tools are required. Because of its flexibility and the form retaining ability of central flexible member 32, the corrosion seal which is annular in shape may be stored in a non-annular form and when removed for use, it will "remember" or retain its shape so that it is ready for installation. The corrosion seal of the present invention provides the above advantages so that it is easy to store prior to its use, easily installed, provides self retention when installed, and is easily removed.

We claim:

1. In a wheel rim assembly having a wheel rim with first bead flange, a separable second bead flange, a retaining ring assembly having inboard and outboard portions, the inboard portion received within a groove in the wheel rim to secure the separable second bead flange on the wheel rim, and a flexible composite seal disposed adjacent the outboard portion of the retaining ring assembly, the wheel rim and the second bead flange having oppositely disposed complementary shaped lobe grooves extending radially inwardly and radially outwardly respectively, an axial opening extending between said second bead flange and wheel rim and being in alignment with said outboard portion, and the flexible composite seal member disposed within the axial opening and oppositely disposed complementary shaped lobe grooves, the composite seal member comprising a central flexible member and a radially extending flexible base member extending at opposite ends into oppositely disposed spaced apart flexible lobe members each received within a respective oppositely disposed complementary shaped lobe groove to retain the composite seal member within the axial opening.

2. The wheel rim assembly in accordance with claim 1, wherein the radially extending flexible base member and oppositely disposed spaced apart lobe members are made of butadiene acrylonitrile.

3. The wheel rim assembly in accordance with claim 2, wherein said central flexible member is generally rectangularly shaped and made from H1 heel stock.

4. The wheel rim assembly in accordance with claim 3, wherein the flexible composite seal is a corrosion seal which prevents contaminants from entering into an area between the second bead flange and wheel rim, the area occupied by said retaining ring assembly.

5. The wheel rim assembly in accordance with claim 4, wherein each of the lobe grooves is disposed at an acute angle relative to a peripheral center line of said radially extending flexible base member 6. The wheel rim assembly in accordance with claim 5, wherein the composite seal has a generally T-shaped cross section.

7. The wheel rim assembly in accordance with claim 1, wherein the flexible base member includes a plurality of axially extending protrusions on a side opposite from said central flexible member.

* * * * *